United States Patent Office 2,840,559
Patented June 24, 1958

2,840,559

NUCLEARLY SUBSTITUTED 8-THEOPHYLLINES AND METHOD OF MAKING THE SAME

John C. Krantz, Jr., Ruxton, and Raymond M. Burgison and George P. Hager, Baltimore, Md.; said Burgison and said Hager assignors to said Krantz, Jr.

No Drawing. Application June 22, 1954
Serial No. 438,608

4 Claims. (Cl. 260—256)

This invention relates to nuclearly substituted 8-theophyllines and to methods for their preparation. More particularly, the invention relates to the preparation of derivatives of theophylline substituted in the 8-position of the molecule with a ring-substituted aralkyl group.

It has heretofore been proposed by some of us that 8-benzyltheophylline might be a potent hypotensive agent in the control or relief of hypertension but pharmacologic tests and clinical studies have not borne out that hope. We have now found, however, that if the 8-position of the theophylline molecule is substituted by an aralkyl group of 1 or 2 rings, that is, an alkyl substituted with one or more phenyl or naphthyl groups, and the ring, or a ring, of the aryl component of the aralkyl group is substituted, the resulting derivative is a potent hypotensive agent. All of the compounds hereinafter more specifically described and claimed are believed to be novel and to have utility not only in the pharmaceutical field in the treatment of animals and humans but also as intermediates in the making of resins, dyes and other compounds.

It is therefore an important object of this invention to provide novel chemical compounds that may be broadly designated as nuclearly substituted 8-aralkyl theophyllines, and to provide methods for their preparation.

It is a further object of this invention to provide theophylline compounds that have been substituted in the 8-position of the molecule with an aralkyl, or more specifically an arylmethyl group, wherein the aryl component is a mono- or di-carbocyclic aromatic radical and is itself nuclearly substituted.

Other and further important objects of this invention will become apparent from the following description and appended claims.

The compounds to which this invention relates are theophylline substituted in the 8-position of the molecule by a nuclearly substituted group. In the case of the aralkyl substitution, the alkyl group is methyl and the aryl radical of the aralkyl group is a 1- or 2-ring group, viz., a phenyl, di-phenyl or a naphthyl radical and the ring is substituted with one or more of the groups: chlorine, bromine, amino, acetylamino, hydroxy, methoxy, ethoxy and methylene dioxy.

The formula of theophylline is:

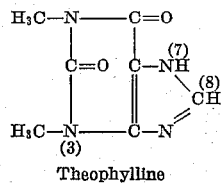

Theophylline

The compounds of this invention may therefore be represented by the general formula:

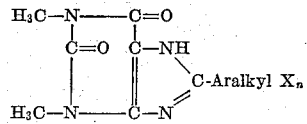

wherein the aralkyl group is a nuclearly substituted phenyl radical, a nuclearly substituted diphenyl radical or a nuclearly substituted naphthyl radical, and in which the substitution group X may be a chlorine or a bromine atom, or amino, acetylamino, hydroxy, methoxy, methylene dioxy or ethoxy group.

Where the alkyl radical is methyl ($CH_3$) and the aryl radical of the compounds in the foregoing general formula is a monocarbocyclic aromatic radical, the resulting series of compounds may be represented by the following formula:

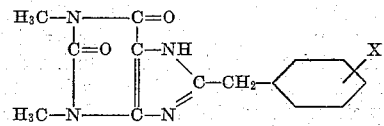

wherein X is a halogen, such as chlorine or bromine, a lower alkoxy group such as methoxy or ethoxy, an amino, acetyl-amino, hydroxy, or a lower alkene oxy group, and $n$ is an integer of 1 or 2.

Table I below identifies some of the theophylline compounds coming under the formula given above, specifies the acid used in introducing the R radical and gives the melting point (uncorrected) of the final compound:

TABLE I

| No. of Cmpd. | R | Acid | M. P., °C. |
|---|---|---|---|
| 1 | p-BrC$_6$H$_4$CH$_2$ | p-bromophenylacetic | 292 |
| 2 | p-ClC$_6$H$_4$CH$_2$ | p-chlorophenylacetic | 295-7 |
| 3 | p-CH$_3$CONHC$_6$H$_4$CH$_2$ | p-acetylaminophenyl-acetic | 275-80 (dec.) |
| 4 | p-NH$_2$C$_6$H$_4$CH$_2$ | p-aminophenylacetic | 297-8 (dec.) |
| 5 | p-HOC$_6$H$_4$CH$_2$ | p-hydroxyphenylacetic | 318 |
| 6 | p-CH$_3$OC$_6$H$_4$CH$_2$ | p-methoxyphenylacetic | 276-7 |
| 7 | 3',4'(CH$_3$O)$_2$C$_6$H$_3$CH$_2$ | 3,4-dimethoxyphenyl, acetic. | 245 |
| 8 | 3',4'(CH$_2$O$_2$)C$_6$H$_3$CH$_2$ | 3,4 - methylenedioxy - phenylacetic. | 308-9 (dec.) |
| 9 | 3',4'(HO)$_2$C$_6$H$_3$CH$_2$ | 3,4-dihydroxyphenyl-acetic. | 315 |

(Dec.—means decomposes.)

The general method employed for the preparation of the theophylline compounds of our invention is that of condensing 1,3-dimethyl-4,5-diamino uracil with a carboxylic acid having a residue corresponding to that which it is desired to introduce into the 8-position of the theophylline structure. Thus, if R is to be an aryl substituted methyl group, the aryl substitution being either one or two rings, this is, either phenyl, diphenyl or naphthyl, then the corresponding phenyl-, diphenyl- or naphthyl-acetic acid may be condensed with 1,3-dimethyl-4,5-diamino uracil.

The reaction appears to proceed in two definite stages: in the first or fusion stage, the OH group of the carboxylic (COOH) acid reacts with the free amino group in 5-position splitting off a molecule of water with the resulting formation of the amide. The amide, upon being subjected to the action of hot alkali cyclicizes and the corresponding theophylline derivative is obtained upon acidification. The reaction is illustrated by the following equations:

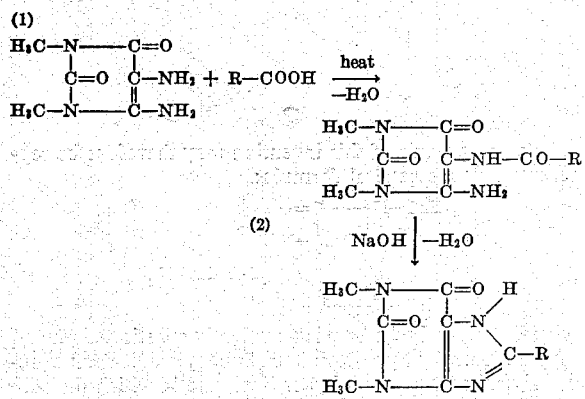

The following examples will serve to illustrate the preparation of the compounds of our invention:

*Example I.—8-(p-bromobenzyl) theophylline*

One hundred and seventy grams (170 g. or 1 mole) of 1,3-dimethyl-4,5-diamino uracil and 215 g. (1 mole of p-bromophenylacetic acid were thoroughly mixed and transferred to a container immersed in an oil bath. The temperature of the oil bath was gradually raised over a period of about 1 hour to 200° C. and maintained at that temperature for about 3 hours. During this heating period, the mixture was well stirred as it softened, but it did not melt, just turned dark.

The cooled mass was broken up and transferred to a glass container, treated with 120 g. of NaOH in 2 liters of hot water and boiled vigorously for a period of 1 hour. The hot solution was filtered, cooled and the crude theophylline derivative was precipitated by the introduction into the solution of carbon dioxide gas or by acidifying with dilute acid. The crude 8-(p-bromobenzyl) theophylline obtained as a precipitate was filtered, washed and dried.

The crude product was purified by repeated precipitation from alkaline solutions with carbon dioxide gas, or dilute acids or by recrystallization from appropriate solvents, until the product was practically colorless.

This partially purified product was further purified by repeating the decolorizing procedure with carbon in a basic solution and reprecipitating by the addition of acid or $CO_2$.

Slightly impure material can be still further purified by recrystallizing from an appropriate solvent. The melting point of the pure 8-(p-bromobenzyl) theophylline was 292° C.

*Example II.—8-(p-chlorobenzyl) theophylline*

The same procedure was used as in Example I except that 170 g. (1 M) of p-chlorophenylacetic acid was used in place of the p-bromophenylacetic acid.

*Example III.—8-(p-amino benzyl) theophylline*

The same procedure was used as in Example I except that 151 g. (1 M) of p-aminophenylacetic acid were used in place of the p-bromophenylacetic acid and except that the impure product was purified by recrystallizing from 70% ethanol.

After the pure 8-(p-aminobenzyl) theophylline had been recovered it was converted into the hydrochloride salt by dissolving the free amine in hydrochloric acid and reducing the volume of the resulting solution at reduced temperature and pressure to a thin syrup. The hydrochloride was precipitated by the addition of alcohol to the syrupy solution.

The hydrochloride salt of 8-(p-aminobenzyl) theophylline is soluble in water and can be administered perorally in a capsule containing 100 mg. or other appropriate dosage of the compound.

*Examples IV through IX*

In these examples one (1) mole of the corresponding acids in each of the lines of Table I for compounds 4 through 9, respectively, was substituted for the 1 mole of p-bromophenylacetic acid of Example I and the procedure of Example I otherwise followed to produce the corresponding 8-substituted theophylline.

The other compounds within the general structural formula given above can be prepared in an wholly analogous manner, using the acids of Table I or similar diphenyl- or naphthyl- acetic acids substituted in the ring with any of the substituents theretofore specified.

We claim as our invention:

1. As a new product, 8-(p-amino-benzyl) theophylline.
2. Compounds having the general formula:

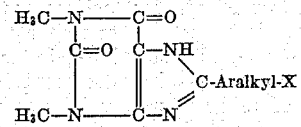

wherein the aralkyl group has from one to two rings nuclearly substituted by no more than 2 groups of X wherein X is attached to the aromatic nucleus and is selected from the group consisting of chlorine and bromine atoms, amino, acetylamino, hydroxy, methoxy, methylene dioxy and ethoxy groups.

3. The compounds of claim 2 wherein X is acetylamino in the para poistion.

4. A method of making an 8-substituted theophylline represented by the following formula.

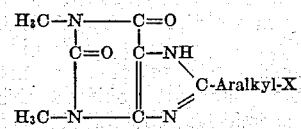

wherein the aralkyl carboxylic group has from one to two rings nuclearly substituted by no more than 2 groups of X wherein X is attached to the aromatic nucleus and is selected from the group consisting of chlorine and bromine atoms, amino, acetylamino, hydroxy, methoxy, methylene dioxy and ethoxy groups, which method comprises condensing 1.3-dimethyl-4.5-diamino uracil with an X-substituted aralkyl acid to split off a molecule of water with the resulting formation of the corresponding amide, subjecting the resulting amide to the action of hot alkali to cyclicize the same, and adjusting the pH of the resulting mass to liberate a theophylline derivative of the formula herein specified.

References Cited in the file of this patent

UNITED STATES PATENTS 955,587    Englemann et al. _____ Apr. 19, 1910

OTHER REFERENCES

Hager et al.: Jour. American Pharm. Assoc., vol. 43, pages 152–155 (1954).